P. SMITH.
SCREW DRIVER.
APPLICATION FILED JAN. 31, 1918.

1,273,193.

Patented July 23, 1918.

Inventor
P. Smith

Witnesses

By

Attorneys

UNITED STATES PATENT OFFICE.

PERCY SMITH, OF DETROIT, MICHIGAN.

SCREW-DRIVER.

1,273,193.  Specification of Letters Patent.  Patented July 23, 1918.

Application filed January 31, 1918. Serial No. 214,669.

*To all whom it may concern:*

Be it known that I, PERCY SMITH, a citizen of the Dominion of Canada, residing at Detroit, in the county of Wayne, State of Michigan, have invented certain new and useful Improvements in Screw-Drivers; and I do hereby declare the following to be a full, clear, and exact description of the invention, such as will enable others skilled in the art to which it appertains to make and use the same.

This invention relates to new and useful improvements in screw drivers.

One object of the present invention is to provide a novel and improved construction whereby a better grip can be had on the handle of the device and whereby the screw can be turned in or out with the danger of mutilation of the head of the screw reduced to a minimum.

Another object is to provide a novel and improved means of connecting the stem and handle of the device together.

Other objects and advantages will be apparent from the following description when taken in connection with the accompanying drawing.

Figure 1:
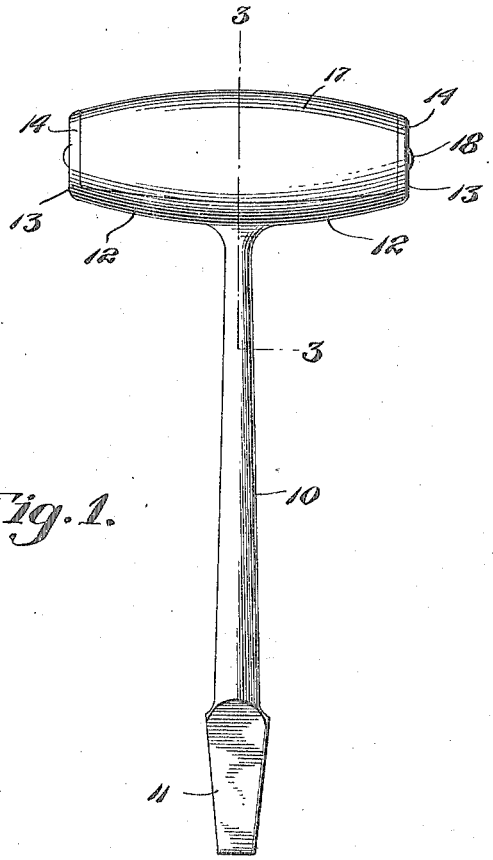
Figure 1 is a front elevation of my improved screw driver.
Figure 2:
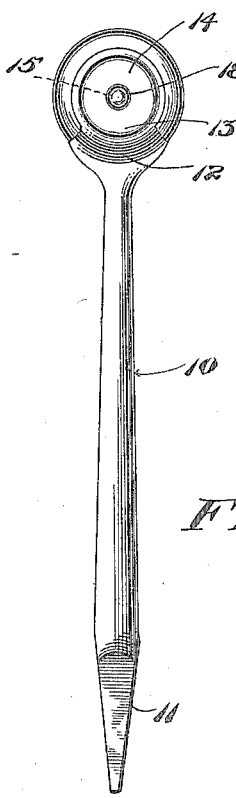
Fig. 2 is a side elevation of the same.
Figure 3:
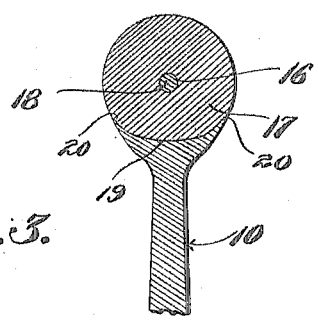
Fig. 3 is an enlarged vertical sectional view taken on the line 3—3 of Fig. 1.

In the drawing, 10 represents a stem which has its lower end flattened and widened, as at 11, to form the screw driver point for engagement in the groove of the head of a screw. The upper end of the stem is formed with oppositely directed horizontal arms 12, the outer end of each of which is turned upwardly, as at 13, and is formed with a circular disk portion 14, the center of which is formed with an opening 15. These openings are disposed in direct alinement and register with the ends of the central longitudinal bore 16, formed in the wooden, or other similar hand grip member 17. Through the openings of the portions 14, and through the bore of the grip 17, is disposed a pin 18, the ends of which are mashed against the outer faces of the portions 14, to retain the pin in proper position.

The upper faces of the arms 12 are formed with the longitudinal channels 19, in which the lower side of the grip 17 is seated. The lower side of the grip 17 is formed with the longitudinally extending grooves 20 which receive the upper edges of the side walls of the arms whereby the forward and rear faces of the upper portions of the stem, or the arms 12 will lie flush with the surface of the grip.

There is thus formed a transverse head on the stem which serves as an effective hand grip when operating the screw driver. This type of handle is more easily grasped and held than the ordinary straight handle commonly employed on screw drivers.

What is claimed is:

A screw driver including a stem having a screw engageable portion on one end, oppositely directed channeled arms on the other end of the stem, the ends of the arms being turned at right angles to the arms and in parallel relation to each other, the said ends being formed with centrally apertured disks, and a grip member disposed between the disks and seated in said channeled arms, said grip member being longitudinally grooved to receive the side walls of the channel, and a retaining pin member disposed through the grip member and through the apertured disks.

In testimony whereof, I affix my signature, in the presence of two witnesses.

PERCY SMITH.

Witnesses:
RICHARD PIGUILLEM,
FRANK C. FOSTER.

Copies of this patent may be obtained for five cents each, by addressing the "Commissioner of Patents, Washington, D. C."